US011974104B2

(12) United States Patent
Liang et al.

(10) Patent No.: US 11,974,104 B2
(45) Date of Patent: Apr. 30, 2024

(54) LINEARITY COMPENSATION METHOD AND RELATED ACOUSTIC SYSTEM

(71) Applicant: xMEMS Labs, Inc., Santa Clara, CA (US)

(72) Inventors: Jemm Yue Liang, Sunnyvale, CA (US); Yanchen Lu, Campbell, CA (US); Hao-Hsin Chang, New Taipei (TW)

(73) Assignee: xMEMS Labs, Inc., Santa Clara, CA (US)

( * ) Notice: Subject to any disclaimer, the term of this patent is extended or adjusted under 35 U.S.C. 154(b) by 204 days.

(21) Appl. No.: 17/575,617

(22) Filed: Jan. 13, 2022

(65) Prior Publication Data

US 2022/0256283 A1 Aug. 11, 2022

Related U.S. Application Data

(60) Provisional application No. 63/147,638, filed on Feb. 9, 2021.

(51) Int. Cl.
*H04R 3/00* (2006.01)
*H04R 3/04* (2006.01)

(52) U.S. Cl.
CPC ............... *H04R 3/005* (2013.01); *H04R 3/04* (2013.01)

(58) Field of Classification Search
CPC .................................. H04R 3/005; H04R 3/04
USPC ............................................... 381/56, 58, 59
See application file for complete search history.

(56) References Cited

U.S. PATENT DOCUMENTS

2006/0014570 A1* 1/2006 Marx ........................ H04R 5/04 455/569.1
2012/0177224 A1* 7/2012 Veneri .................... H04R 3/002 381/103

* cited by examiner

*Primary Examiner* — William A Jerez Lora
(74) *Attorney, Agent, or Firm* — Winston Hsu

(57) ABSTRACT

A linearity compensation method for a sound producing device (SPD) includes steps of: applying a test signal on a first SPD; obtaining an acoustic measurement result generated from the first SPD according to the test signal; generating a compensation curve according to the acoustic measurement result; and performing a linearity compensation operation on a second SPD according to the compensation curve.

23 Claims, 6 Drawing Sheets

LINEARITY COMPENSATION METHOD AND RELATED ACOUSTIC SYSTEM

CROSS REFERENCE TO RELATED APPLICATIONS

This application claims the benefit of U.S. Provisional Application No. 63/147,638, filed on Feb. 9, 2021. The content of the application is incorporated herein by reference.

BACKGROUND OF THE INVENTION

1. Field of the Invention

The present invention relates to a method used in an acoustic system, and more particularly, to a linearity compensation method and a related acoustic system.

2. Description of the Prior Art

A sound producing device (SPD) such as a speaker or earphone may possess a linearity problem, where the SPD may include a membrane capable of making sounds when driven by an electrical signal such as a voltage signal. In general, the voltage signal may drive the membrane of the SPD to move, and the mechanical displacement caused by such movement may compress air particles to generate sound waves. The sound magnitude generated by the SPD may be nonlinear with respect to the input voltage signal, and linearity compensation (LC) is performed to solve this problem.

The above driving scheme of the SPD requires a conversion from an electrical signal to a mechanical movement and then to an acoustic signal (i.e., the sound waves). In the prior art, the implementation of the LC algorithm is performed and the LC curve is generated based on the direct measurement on the mechanical characteristics of the SPD. The matter is complicated by factors such as the characteristics of the actuator used in actuating the speaker, the mechanical designs of the membrane of the SPD, and stress established during the fabrication process of the SPD. For example, the most commonly used piezoelectric material (PZT) actuator has a permittivity that typically drops sharply as the voltage applied across the PZT actuator rises. The PZT may also exhibit a certain degree of hysteresis which may impact the displacement of the membrane depending on whether the voltage is increasing or decreasing. In addition, due to the variation of hysteresis behavior, when idle and the voltage applied across the PZT actuator falling to 0V, the PZT may “fall asleep” and will require a “wake up” procedure to bring the PZT back to its intended normal operation condition.

The stress of the membrane design, in particular the pattern of slits (i.e., fine lines cutting through the thickness of the membrane to increase the compliances of the membrane), will greatly affect the membrane displacement. For example, the slit pattern and variation of the micro-electro-mechanical system (MEMS) fabrication process may cause different locations of the membrane to experience different stress and therefore exhibit different degrees of distortion of linearity. In addition, various modes of resonance of the membrane may cause the displacement to differ at different locations, depending on the stimulus signal used during the measurement. Therefore, it is difficult to correlate the mechanical measurement made at a limited number of spots on the membrane to the acoustic result due to the above challenges, such that the membrane displacement measurement may not be able to construct the LC curve with high enough accuracy for acoustic application. Thus, there is a need for improvement over the prior art.

SUMMARY OF THE INVENTION

It is therefore an objective of the present invention to provide a linearity compensation method and a related acoustic system, in order to solve the abovementioned problems.

An embodiment of the present invention discloses a linearity compensation method for a sound producing device (SPD). The linearity compensation method comprises steps of: applying a test signal on a first SPD; obtaining an acoustic measurement result generated from the first SPD according to the test signal; generating a compensation curve according to the acoustic measurement result; and performing a linearity compensation operation on a second SPD according to the compensation curve.

Another embodiment of the present invention discloses a linearity compensation method for an SPD. The linearity compensation method comprises steps of: generating a sensitivity curve comprising a plurality of sensitivity values for a first SPD; integrating the plurality of sensitivity values to generate a plurality of linearity data; and generating a plurality of compensation data according to the plurality of linearity data.

Another embodiment of the present invention discloses an acoustic system, which is configured to drive a first SPD. The acoustic system comprises a memory and a computation circuit. The memory is configured to store a plurality of compensation data. The computation circuit, coupled to the memory, is configured to receive a driving voltage for the first SPD, and compute a compensated voltage according to the driving voltage and a compensation data of the plurality of compensation data corresponding to the driving voltage. Wherein, the plurality of compensation data are comprised in a compensation curve generated according to an acoustic measurement result; and wherein, the acoustic measurement result is generated from a second SPD by applying a test signal on the second SPD.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a method for linearity compensation (LC), to obtain an LC curve based on a novel acoustic measurement procedure that will bypass the intricacy of the interactions between various electrical, mechanical and structural factors of the movements of an actuated membrane of micro-electromechanical system (MEMS) sound producing device (SPD), and obtain a comprehensive acoustic behavior of the MEMS SPD directly by using acoustically measured data of the MEMD SPD to construct the LC curve.

Figure 1:
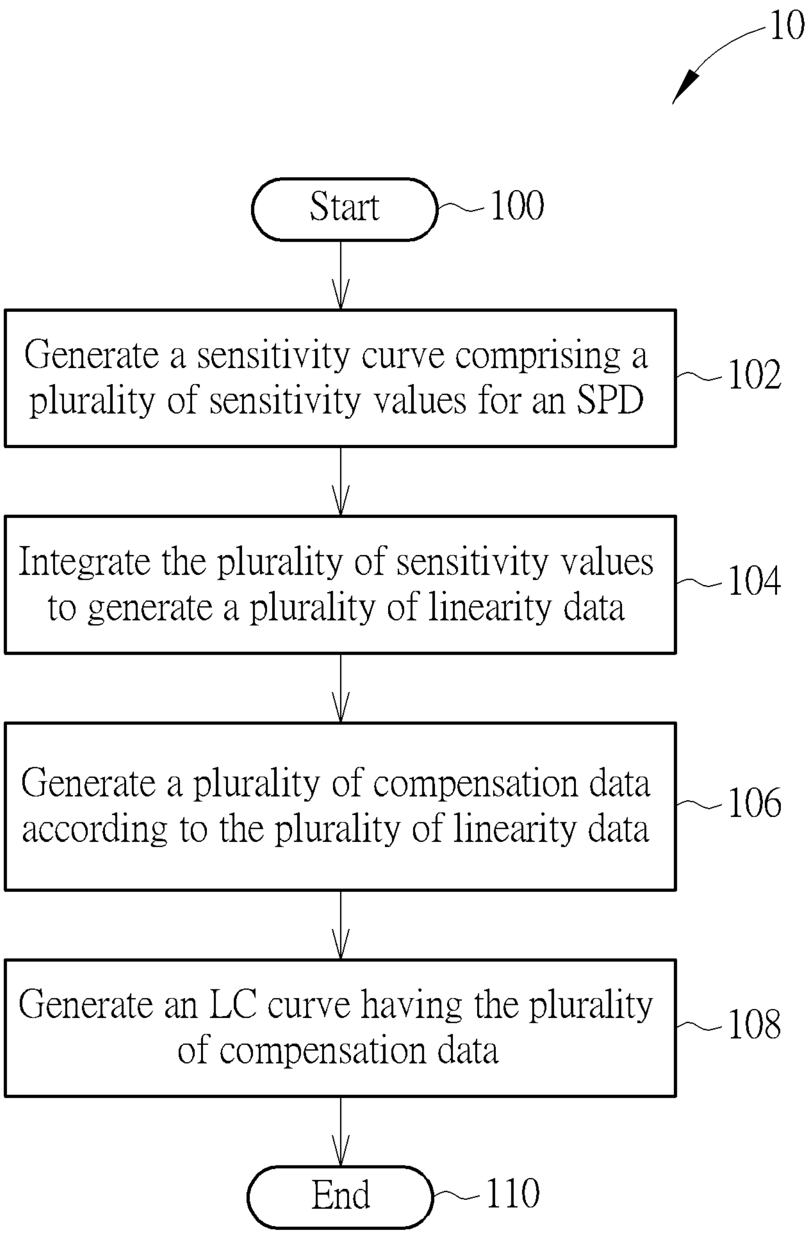
FIG. 1 is a flowchart of an LC process according to an embodiment of the present invention.

Please refer to FIG. 1, which is a flowchart of an LC process 10 according to an embodiment of the present invention. The LC process 10 may be used to generate the LC curve for performing LC on the SPD. As shown in FIG. 1, the LC process 10 includes the following steps:

Step 100: Start.

Step 102: Generate a sensitivity curve comprising a plurality of sensitivity values for an SPD.

Step 104: Integrate the plurality of sensitivity values to generate a plurality of linearity data.

Step 106: Generate a plurality of compensation data according to the plurality of linearity data.

Step 108: Generate an LC curve having the plurality of compensation data.

Step 110: End.

According to the LC process 10, a sensitivity curve comprising sensitivity values for the SPD may be generated (Step 102). The SPD may be a piezoelectric actuated MEMS SPD as described above, which makes sounds when driven by a voltage signal. Instead of measuring the mechanical characteristics of the SPD, spot-by-spot, to find out the electrical-to-mechanical relationship, the present invention directly measures the acoustic characteristics of the SPD with respect to the input voltage signal, where the acoustic measurement result may be represented as the sensitivity curve as in the LC process 10.

Figure 2:
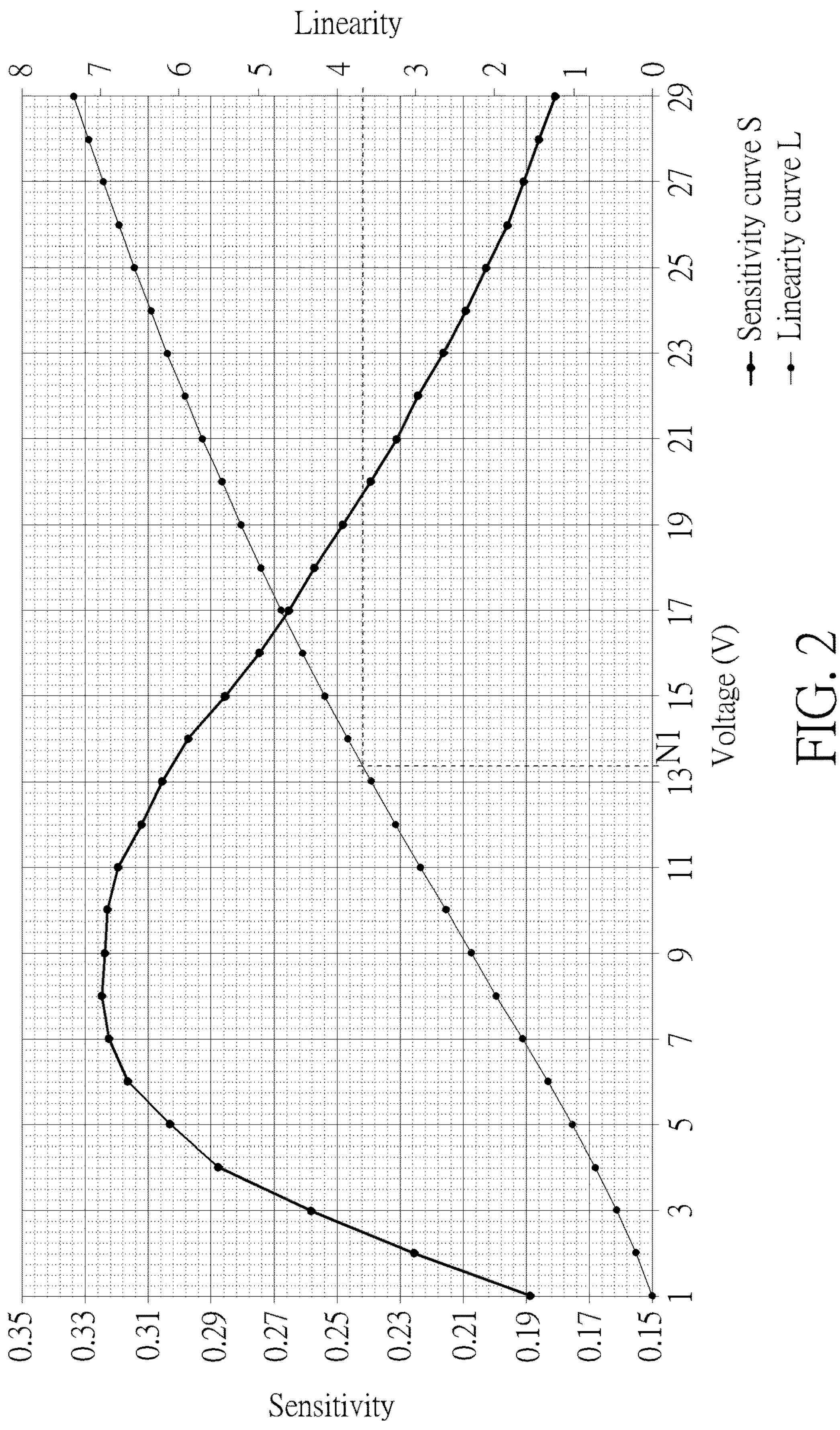
FIG. 2 illustrates the waveforms of a measured sensitivity curve and a linearity curve according to an embodiment of the present invention.

In an embodiment, the sensitivity values of the sensitivity curve in terms of acoustic measurement may be a sound pressure level (SPL), corresponding to a test signal of certain frequency and alternating current (AC) amplitude. FIG. 2 illustrates the waveforms of a measured sensitivity curve S and a linearity curve L according to an embodiment of the present invention. As shown in FIG. 2, supposing that the SPD has an operating voltage range from 1V to 29V, the SPL may be measured under 300 Hz with the input AC signal amplitude of 1V, and a bias voltage from 1V to 29V, to generate the sensitivity values corresponding to 1V-29V, respectively, and thereby generate the sensitivity curve S. The measurement result shows that the SPD has the highest output SPL around the input bias voltage values 8V-9V which means the SPD is the most sensitive around the input bias voltage values 8V-9V, and that the sensitivity value gradually decreases as the input voltage becomes larger or smaller.

The sensitivity curve S as shown in FIG. 2 may be obtained by applying a test signal on the SPD. The test signal may include a series of input voltage signals used to perform the acoustic measurement, such as a 300 Hz signal of 1V amplitude and a bias between 1V and 29V, where the SPL of the SPD may be detected when the SPD receives the test signal.

Figure 3:
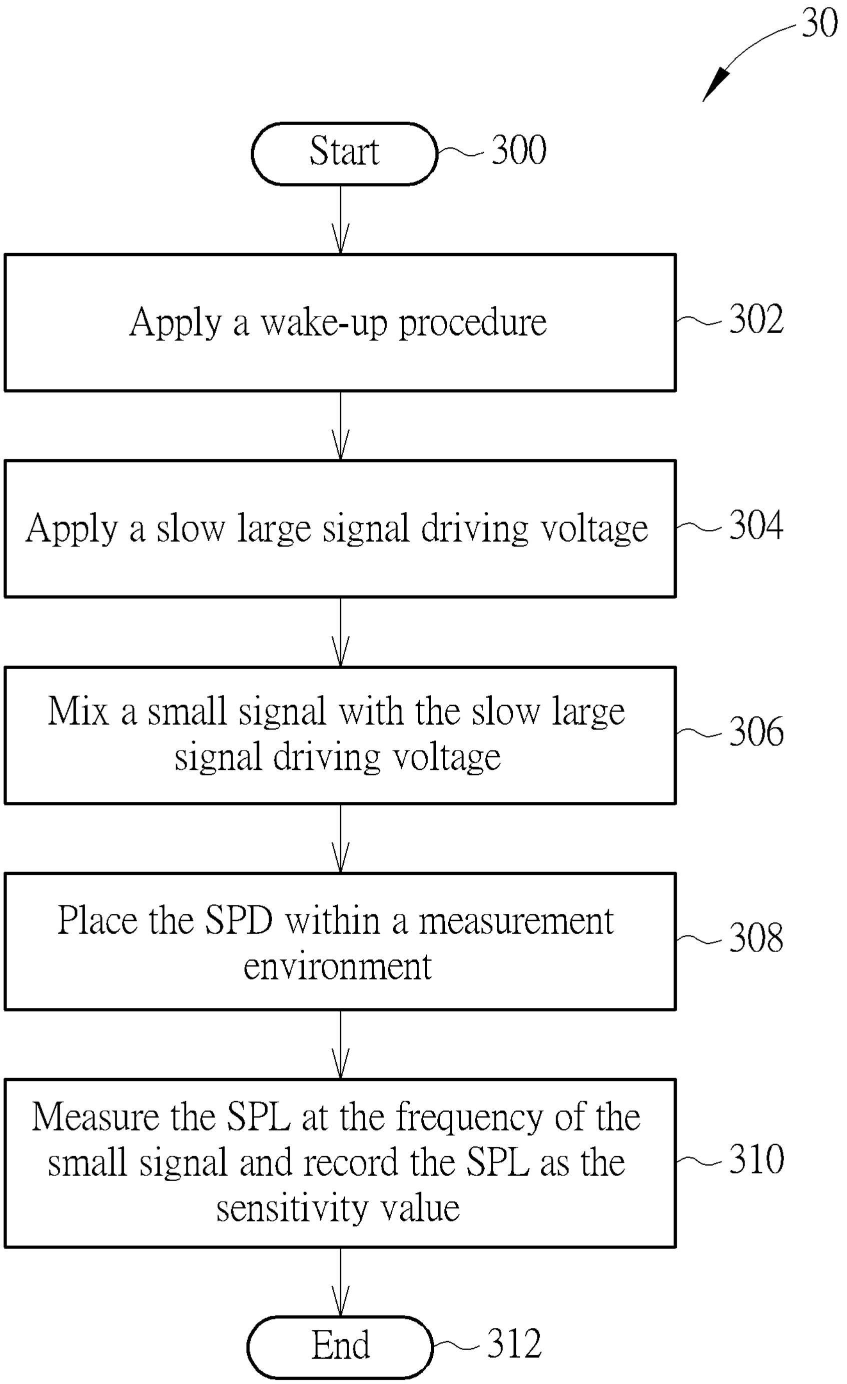
FIG. 3 is a flowchart of an acoustic measurement process according to an embodiment of the present invention.

Please refer to FIG. 3, which is a flowchart of an acoustic measurement process 30 according to an embodiment of the present invention. The acoustic measurement process 30 may be used to provide the test signal for generating the sensitivity curve 5 shown in FIG. 2, where the acoustic characteristics of the SPD in its operating voltage range 1V-29V are obtained. As shown in FIG. 3, the acoustic measurement process 30 includes the following steps:

Step 300: Start.

Step 302: Apply a wake-up procedure.

Step 304: Apply a slow large signal driving voltage.

Step 306: Mix a small signal with the slow large signal driving voltage.

Step 308: Place the SPD within a measurement environment.

Step 310: Measure the SPL at the frequency of the small signal and record the SPL as the sensitivity value.

Step 312: End.

According to the acoustic measurement process 30, the wake-up procedure is applied first. In the wake-up procedure, awake-up signal, which may be a 1 kHz sine-wave signal swinging between 1V and 29V, is applied to the SPD. The wake-up signal may drive the SPD to enter its normal operating status. Subsequently, a slow large signal driving voltage and a small signal are generated and mixed. In an exemplary embodiment, the large signal driving voltage may be a 3 Hz sine-wave signal swinging between 1V and 29V, and the small signal may be a 300 Hz sine-wave signal with amplitude equal to 0.5V or 1V, but not limited thereto. The SPD is then placed within a measurement environment such as an ear emulator. The ear emulator is capable of measuring the SPL of the SPD at the frequency (e.g., 300 Hz) of the small signal, and the SPLs on the target voltage values from 1V to 29V may be recorded as the sensitivity values. Since the small signal is carried on the slow large signal swinging between voltages 1V and 29V, the SPL at the small signal frequency may be measured automatically when the large signal changes to the target voltage values, so as to generate the sensitivity curve S from 1V to 29V.

Note that the steps discussed above are for illustrations only and the details of each step, or the sequence and the compositions of the steps, may differ depending on the specific device being measured and/or the results to be targeted. For example, the wake-up procedure (Step 302) might be repeated during the measurement step (Step 310). In addition, the frequencies and/or amplitudes of the large signal and/or the small signal may have other appropriate values, or may go through a set of different values instead of one fixed value. Further, the large signal may swing by N cycles, preferably N greater than 50, and the measured SPLs in these cycles may be averaged to obtain the sensitivity data.

Alternatively, the SPL may be measured by incorporating the small signal swing in several target voltage values, respectively; that is, the voltage values may change manually instead of using a slow large signal to realize the target voltage values.

Please refer back to FIG. 1 and FIG. 2. After the sensitivity curve S of the SPD is obtained, the sensitivity curve S is used to generate the linearity curve L. For example, the sensitivity values may be integrated or summed up to generate the linearity data, thereby constructing the linearity curve L (Step 104). The integration may be expressed as follows:

$$L(V) = \int_0^V S \cdot dV. \tag{1}$$

After the linearity curve L and linearity data of the SPD are determined, the compensation data for the SPD may be generated according to the linearity data (Step 106). In an embodiment, the compensation data for the SPD may be obtained by calculating the reciprocal of the linearity data.

Subsequently, the LC curve Cv having the compensation data may be generated (Step 108). The relation of the linearity curve L and the LC curve Cv may satisfy:

$$L \times Cv = Cosnt; \tag{2}$$

where the value Const may be 1 or any other appropriate constant.

In another perspective, the linearity curve L and the LC curve Cv may be regarded as kind of mapping relationship or transfer function, and L×Cv may be regarded as a composite transfer function of L and Cv. Equation (2) may be interpreted that the slope of the composite transfer function L×Cv should be constant, i.e., a straight line, or, a linearized curve.

That is, for (ideal) linear SPD, L shall have property as L(Vin)=a·Vin, where a is some positive constant (e.g., a=1), and L(•) can be regarded as a function (mapping relationship) mapping from (input) electric signal Vin to mechanical membrane movement/displacement L. Practically, SPD is usually non-linear, which means that L(Vin)≠a·Vin. The compensation curve/operation Cv would be needed to improve the overall linearity, such that Cv(L(Vin)) versus yin would be a straight line, which may be expressed as Cv(L(Vin))=a'·Vin, or any other desired linearity/linearized curve (e.g., curve or mapping relationship corresponding to dynamic range compression/compensation (DRC)). Note that, the constant a' may (or may not) be the same as the constant a, and Cv(•) may represent a mapping relationship.

As can be seen, in the LC process 10 and the related acoustic measurement process 30, the linearity curve L of the SPD and the LC curve Cv are calculated and obtained through the SPL generated from the SPD, where the measurement of SPL is purely acoustic, without considering the membrane displacement or any other mechanical characteristics of the SPD. Therefore, the data for LC are only associated with the acoustic behavior of the SPD without measuring the mechanical characteristics of the SPD such as the displacement of the membrane. Therefore, the various factors that complicates the correlation of the mechanical characteristics and the acoustic behavior and toughens the mechanical measurement may be avoided.

Figure 4:
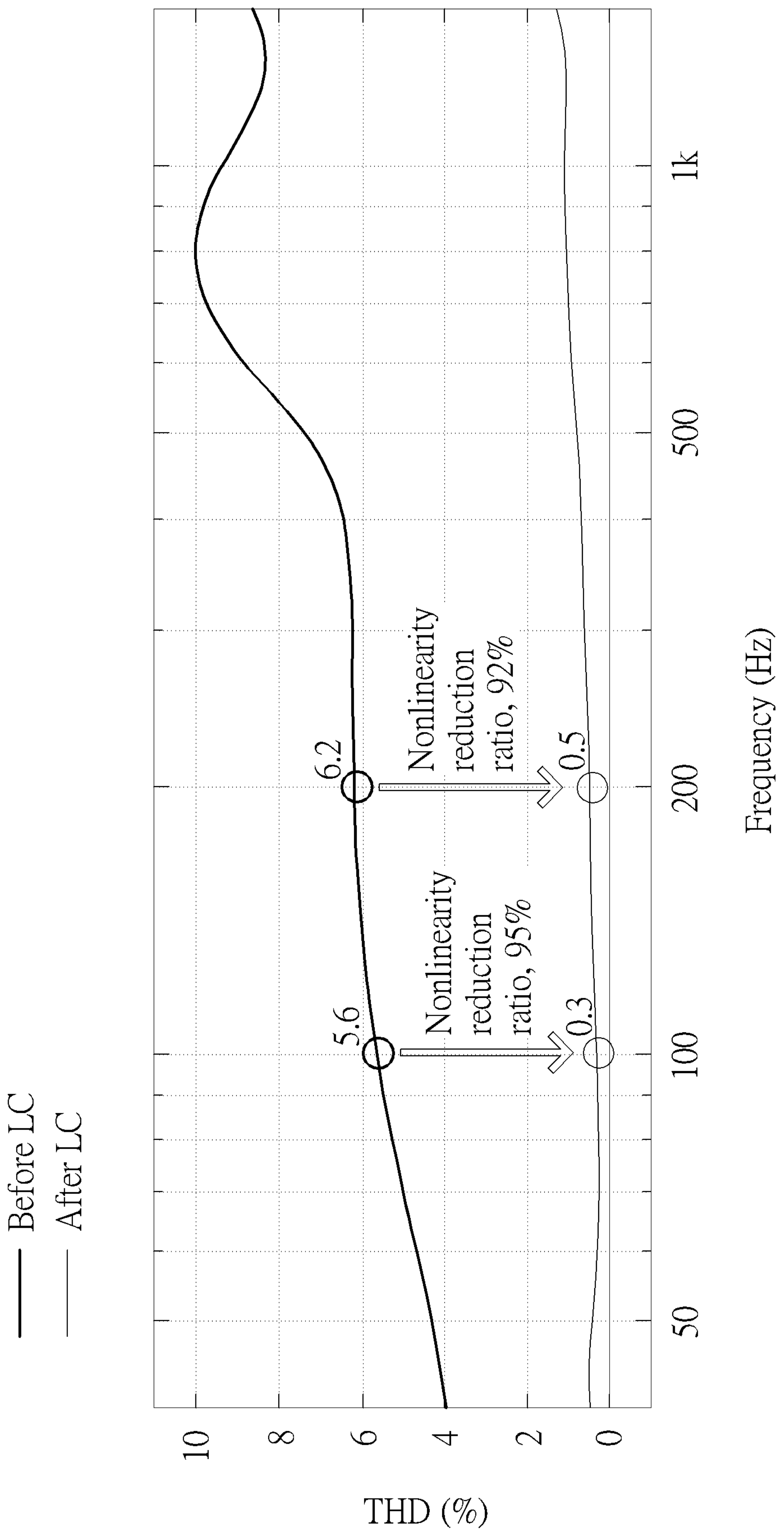
FIG. 4 illustrates the comparison of distortion before LC and after LC.

Please refer to FIG. 4, which illustrates the comparison of distortion before LC and after LC of an actual MEMS SPD. FIG. 4 shows the measured total harmonic distortion (THD) throughout a frequency band with the LC method provided in the present invention, and the THD without LC is shown for comparison. As shown in FIG. 4, the LC may achieve a nonlinearity reduction ratio higher than 90% throughout the frequency band. For example, within the frequency band 100 Hz-200 Hz, the THD before LC falls between 5.6% and 6.2%; if the LC of the present invention is performed, the THD may be reduced to the range between 0.3% and 0.5%, which is a significant improvement of 92%-95%.

Figure 5:
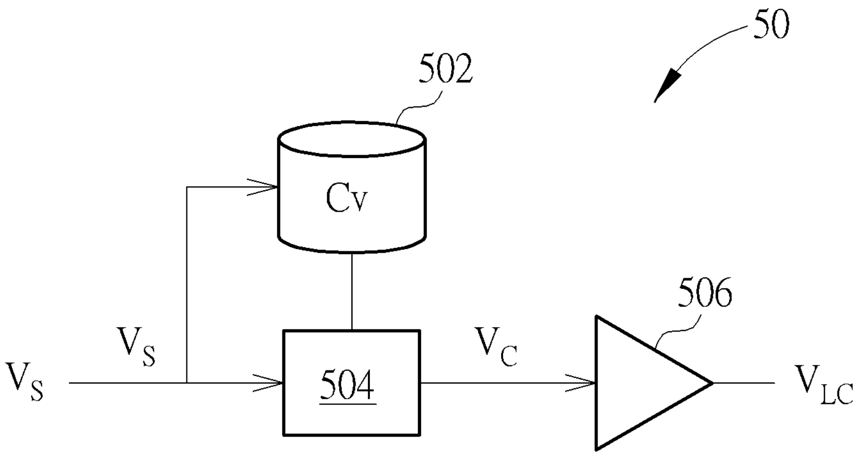
FIG. 5 is a schematic diagram of an acoustic system according to an embodiment of the present invention.

Please refer to FIG. 5, which is a schematic diagram of an acoustic system 50 according to an embodiment of the present invention. As shown in FIG. 5, the acoustic system 50 includes a memory 502, a computation circuit 504 and a power amplifier 506. The acoustic system 50 may receive a driving voltage $V_S$ for an SPD, compensate for the driving voltage $V_S$ based on the above LC method to generate an LC voltage $V_{LC}$, and output the LC voltage $V_{LC}$ to the SPD. In other words, the acoustic system 50 may perform the LC operation on the SPD according to the LC curve Cv.

In detail, the memory 502 is configured to store the LC curve Cv containing the compensation/compensated data corresponding to the driving voltage $V_S$ over the values of $V_S$ within the operating voltage range of the SPD. The LC curve Cv and the compensation data are obtained based on the LC process as described above; that is, the LC curve Cv may be generated according to the linearity curve L by taking its reciprocal, and the linearity curve L may be generated by integrating the sensitivity curve 5, which is measured acoustically from an SPD.

The computation circuit 504 is configured to generate a compensated voltage $V_C$ according to the driving voltage $V_S$ and the compensation data retrieved according to the driving voltage $V_S$ from the memory 502. In an embodiment, a curve fitting operation may be performed by/within the computation circuit 504, in order to calculate the compensated voltage $V_C$. The computation circuit 504, for example, may be realized by an application specific integrated circuit (ASIC) or a processing circuit with computation capability.

In an embodiment, the computation circuit 504 may comprise a multiplier. The multiplier within the computation circuit 504 may receive the driving voltage $V_S$ and compensate for the driving voltage $V_S$ by multiplying the driving voltage $V_S$ by the compensation data retrieved/calculated according to the driving voltage $V_S$, so as to generate the compensated voltage $V_C$. The compensated voltage $V_C$ may have an improved linearity due to the compensation.

After the compensated voltage $V_C$ is generated, the power amplifier 506 may receive the compensated voltage $V_C$ and output the LC voltage $V_{LC}$ corresponding to the compensated voltage $V_C$ to drive the SPD. The power amplifier 506 is configured to provide sufficient driving capability to drive the loads of the SPD. In an embodiment, the LC voltage $V_{LC}$ may be an analog voltage, and the compensated voltage $V_C$ may be in either digital or analog format, which is not limited thereto. In an embodiment, the power amplifier 506 may be optional in linearity compensation perspective or may have unit gain. The compensated voltage $V_C$ may be considered as being equivalent/equal to the LC voltage $V_{LC}$.

The LC operation provided in the acoustic system 50 may achieve the transformation expressed as:

$$V_{LC} = V_S \times Cv. \tag{3}$$

Note that the power amplifier 506 is used to enhance the driving capability, and the gain of the power amplifier 506 may equal 1.

Further note that the sensitivity curve S may be measured and the LC curve Cv may be calculated and generated before the SPD product leaves the factory. The obtained LC curve Cv will then be stored in the memory 502. In an embodiment, every SPD product is requested to perform acoustic measurement to obtain the sensitivity curve S and correspondingly generate the LC curve Cv, and the LC operation for this SPD may be performed based on its corresponding LC curve Cv. For example, the acoustic measurement may be performed on a first SPD to generate the sensitivity curve S, and the related LC curve Cv is applied to perform compensation on the first SPD. In another embodiment, one or more samples among a batch of SPD products may be used to measure the sensitivity curve S and correspondingly generate the LC curve Cv, which may be applied to perform the compensation of the batch of SPD products. In such a situation, the acoustic measurement may be performed on a first SPD to generate the sensitivity curve S, and the related LC curve Cv may be applied to perform compensation on a second SPD other than the first SPD.

In the acoustic system 50, the power amplifier 506 may contain alternating current (AC) coupling in its feedback stage or the input analog signal is AC coupled to its input stage; hence, a voltage drift may occur due to the unbalanced nature of the LC of Equation (3). For example, as can be observed in the sensitivity curve S shown in FIG. 2, the SPD is the most sensitive around 8V-9V, which is not at the center of the operating voltage range, i.e., 15V. Such a sensitivity peaking at an off-center voltage level causes the center of the device linearity curve L to map to a voltage level 13.3V, as indicated in FIG. 2 by the dashed lines intersecting at the node N1, a voltage drift −1.7V from the mid-voltage level (1+29)/2=15V. If this voltage drift is uncompensated, it will cause the LC of Equation (3) to become ineffective due to the mismatch between the actual device linearity and the modeled linearity curve.

Figure 6:
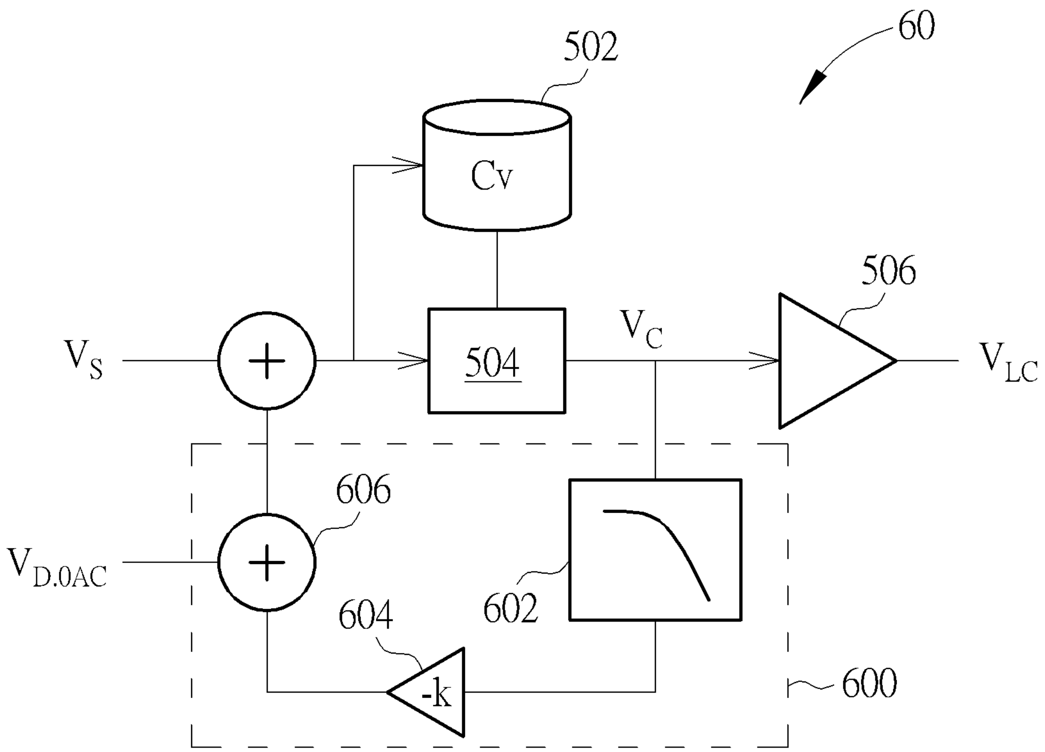
FIG. 6 is a schematic diagram of another acoustic system according to an embodiment of the present invention.

The voltage drift of the LC curve may be compensated by using a feedback circuit in the acoustic system. Please refer to FIG. 6, which is a schematic diagram of another acoustic system 60 according to an embodiment of the present invention. As shown in FIG. 6, the structure of the acoustic system 60 is similar to the structure of the acoustic system 50, so signals and elements having similar functions are denoted by the same symbols. The difference between the acoustic system 60 and the acoustic system 50 is that, the acoustic system 60 further includes a feedback circuit 600, which is configured to compensate for the voltage drift. The feedback circuit 600 may include a low-pass filter 602, a gain amplifier 604 and an adder 606.

The low-pass filter 602 is configured to output the frequency corresponding to the AC coupling effect causing the voltage drift. Therefore, it is desirable to perform a matching level shift by modifying Equation (3) as $V_{LC}=(V_S-V_{D.LC})\times Cv$ such that the effect of AC coupling is nullified and the modeled linearity curve is realigned with the actual device linearity.

However, the new term $V_{D.LC}$ may form a negative feedback loop and may cause oscillation at low frequency. A proper gain margin and phase margin stability analysis should be performed to assure such low frequency oscillation will not occur. The gain amplifier 604 and the adder 606 are configured to achieve this purpose, where the loop stability may be improved by modifying the equation as:

$$V_{LC}=(V_S-(k\cdot V_{D.AC}+V_{D.0AC}))\times Cv; \qquad (4)$$

where $V_{D.0AC}$ is added through the adder 606 to align the midpoint of the device linearity to the zero input voltage such as the anticipated −1.7V drift as shown in FIG. 2, and the term $k\cdot V_{D.AC}$ is the signal output by the low-pass filter 602 multiplied by k through the gain amplifier 604, to compensate for the AC coupled signal while ensuring the loop stability.

Figure 7:
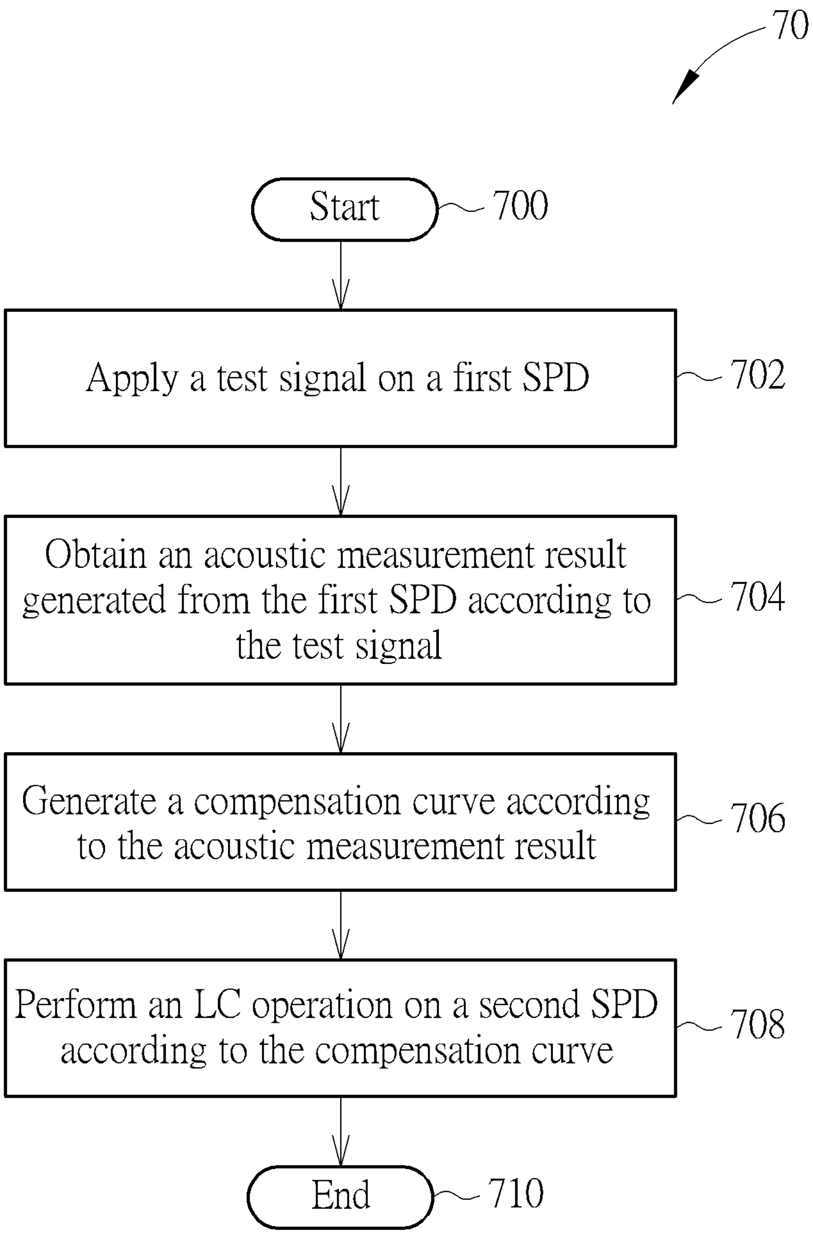
FIG. 7 is a flowchart of a process according to an embodiment of the present invention.

The abovementioned operations of the LC process and the acoustic system may be summarized into a process 70, as shown in FIG. 7. The process 70 includes the following steps:

Step 700: Start.

Step 702: Apply a test signal on a first SPD.

Step 704: Obtain an acoustic measurement result generated from the first SPD according to the test signal.

Step 706: Generate a compensation curve according to the acoustic measurement result.

Step 708: Perform an LC operation on a second SPD according to the compensation curve.

Step 710: End.

In the process 70, the second SPD may be the same as or different from the first SPD. Other detailed implementations and alterations of the process 70 are described in the above paragraphs, and will not be narrated herein.

To sum up, the present invention provides an LC method for an acoustic system. Instead of measuring the mechanical characteristics of the SPD to find out the electrical-to-mechanical relationship, the present invention directly measures the acoustic characteristics of the SPD with respect to the input voltage signal. Therefore, the data for LC are only associated with the acoustic behavior of the SPD. In such a situation, the various factors that complicates the correlation of the mechanical characteristics and the acoustic behavior and toughens the mechanical measurement may be avoided. The LC method provided in this disclosure may achieve a nonlinearity reduction ratio higher than 90% in the interested frequency band.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A linearity compensation method for a sound producing device (SPD), comprising:

applying a test signal on a first SPD;

obtaining an acoustic measurement result generated from the first SPD according to the test signal;

generating a compensation curve according to the acoustic measurement result; and performing a linearity compensation operation on a second SPD according to the compensation curve, to compensate for a linearity of the second SPD relative to a driving voltage for the second SPD.

2. The linearity compensation method of claim 1, wherein the step of obtaining the acoustic measurement result generated from the first SPD according to the test signal comprises:

detecting a sound pressure level (SPL) of the first SPD when the first SPD receives the test signal.

3. The linearity compensation method of claim 1, wherein the test signal comprises a sine-wave signal carried on a plurality of voltages.

4. The linearity compensation method of claim 3, wherein the step of generating the compensation curve according to the acoustic measurement result comprises:

measuring a plurality of SPLs of the first SPD corresponding to the plurality of voltages;

integrating the plurality of SPLs to generate a plurality of linearity data; and generating a plurality of compensation data according to the plurality of linearity data;

wherein the plurality of compensation data construct the compensation curve.

5. The linearity compensation method of claim 4, wherein the step of performing the linearity compensation operation on the second SPD according to the compensation curve comprises:

multiplying the driving voltage for the second SPD by one of the plurality of compensation data corresponding to the driving voltage to generate a linearity compensation voltage; and outputting the linearity compensation voltage to drive the second SPD.

6. The linearity compensation method of claim 4, wherein the step of generating the plurality of compensation data according to the plurality of linearity data comprises:

calculating a reciprocal of the plurality of linearity data to generate the plurality of compensation data.

7. The linearity compensation method of claim 1, wherein the compensation curve is obtained without measuring a mechanical characteristic of the first SPD.

8. A linearity compensation method for a sound producing device (SPD), comprising:

generating a sensitivity curve comprising a plurality of sensitivity values for a first SPD;

integrating the plurality of sensitivity values to generate a plurality of linearity data; and generating a plurality of compensation data according to the plurality of linearity data;

wherein the plurality of compensation data compensate for a linearity of a second SPD relative to a driving voltage for the second SPD.

9. The linearity compensation method of claim 8, wherein the step of generating the plurality of compensation data according to the plurality of linearity data comprises:

calculating a reciprocal of the plurality of linearity data to generate the plurality of compensation data.

10. The linearity compensation method of claim 8, further comprising:

performing a linearity compensation operation on the second SPD according to a compensation curve composed of the plurality of compensation data.

11. The linearity compensation method of claim 10, wherein the step of performing the linearity compensation operation on the second SPD according to the compensation curve composed of the plurality of compensation data comprises:

multiplying the driving voltage for the second SPD by one of the plurality of compensation data corresponding to the driving voltage to generate a linearity compensation voltage; and outputting the linearity compensation voltage to drive the second SPD.

12. The linearity compensation method of claim 8, wherein the plurality of sensitivity values comprise a plurality of sound pressure levels (SPLs) of the first SPD under a test signal.

13. The linearity compensation method of claim 8, wherein the plurality of compensation data are obtained without measuring a mechanical characteristic of the first SPD.

14. An acoustic system, configured to drive a first sound producing device (SPD), the acoustic system comprising:

a memory, configured to store a plurality of compensation data; and a computation circuit, coupled to the memory, configured to receive a driving voltage for the first SPD, and compute a compensated voltage according to the driving voltage and a compensation data of the plurality of compensation data corresponding to the driving voltage;

wherein the plurality of compensation data are comprised in a compensation curve generated according to an acoustic measurement result;

wherein the acoustic measurement result is generated from a second SPD by applying a test signal on the second SPD;

wherein the plurality of compensation data compensate for a linearity of the first SPD relative to the driving voltage for the first SPD.

15. The acoustic system of claim 14, further comprising:

a power amplifier, coupled to the computation circuit and the first SPD, configured to output a linearity compensation voltage corresponding to the compensated voltage to drive the first SPD.

16. The acoustic system of claim 14, wherein the acoustic measurement result comprises a sound pressure level (SPL) of the second SPD.

17. The acoustic system of claim 14, wherein the compensation curve is generated without measuring a mechanical characteristic of the second SPD.

18. The acoustic system of claim 14, wherein the computation circuit comprises a multiplier, and the multiplier is configured to multiply the driving voltage by the compensation data.

19. The acoustic system of claim 14, wherein the compensation curve is generated by performing the following steps:

measuring a plurality of SPLs of the second SPD corresponding to a plurality of voltages;

integrating the plurality of SPLs to generate a plurality of linearity data; and generating the plurality of compensation data of the compensation curve.

20. The acoustic system of claim 19, wherein the compensation curve is generated by further performing the following steps:

calculating a reciprocal of the plurality of linearity data to generate the plurality of compensation data of the compensation curve.

21. The acoustic system of claim 14, further comprising:

a feedback circuit, configured to compensate for a voltage drift of the compensation curve.

22. The acoustic system of claim 21, wherein the feedback circuit comprises:

a low-pass filter, configured to output a frequency corresponding to the voltage drift; and a gain amplifier and an adder, coupled to the low-pass filter, configured to improve a stability of the acoustic system and compensate for the voltage drift.

23. The acoustic system of claim 21, wherein the voltage drift is generated from an alternating current (AC) coupling in the acoustic system.

* * * * *